(12) United States Patent
Maldonado Andrade et al.

(10) Patent No.: US 10,302,141 B2
(45) Date of Patent: May 28, 2019

(54) DRIVE COUPLING FOR CONNECTING DRIVE SHAFT TO OUTPUT MEMBER

(71) Applicant: Cummins Inc., Columbus, IN (US)

(72) Inventors: Miguel Antonio Maldonado Andrade, Columbus, IN (US); Senthil Kumar Selvaraj, Tamilnadu (IN)

(73) Assignee: Cummins Inc., Columbus, IN (US)

( * ) Notice: Subject to any disclaimer, the term of this patent is extended or adjusted under 35 U.S.C. 154(b) by 467 days.

(21) Appl. No.: 15/014,617

(22) Filed: Feb. 3, 2016

(65) Prior Publication Data

US 2017/0219020 A1    Aug. 3, 2017

(51) Int. Cl.
 *F16D 1/08*   (2006.01)
 *F16D 9/06*   (2006.01)
 *F16H 57/021* (2012.01)

(52) U.S. Cl.
 CPC ............ *F16D 1/0876* (2013.01); *F16D 9/06* (2013.01); *F16H 57/021* (2013.01)

(58) Field of Classification Search
 CPC ..... F16D 1/02; F16D 1/06; F16D 1/08; F16D 1/0876; F16D 3/72; F16D 3/725; F16D 9/00; F16D 9/06; F16H 57/0018; F16H 57/0025; F16H 57/021; Y10T 403/11; Y10T 403/7018; Y10T 403/7098
 USPC .......... 464/32, 33, 98, 147, 150, 155; 403/2, 403/355, 383.2, 383
 See application file for complete search history.

(56) References Cited

U.S. PATENT DOCUMENTS

| | | | | |
|---|---|---|---|---|
| 2,060,209 A | * | 11/1936 | Heckert | F02M 37/20 277/366 |
| 2,362,592 A | * | 11/1944 | Spiller | B23D 33/00 464/32 |
| 2,446,133 A | * | 7/1948 | Hawthorne | F16D 9/04 464/32 |
| 4,237,704 A | | 12/1980 | Varadan | |
| 4,411,635 A | | 10/1983 | Boothroyd et al. | |
| 5,215,165 A | | 6/1993 | Torii | |
| 5,501,542 A | | 3/1996 | Hall, Sr. | |
| 6,050,795 A | | 4/2000 | Bodzak et al. | |

(Continued)

FOREIGN PATENT DOCUMENTS

| | | | | |
|---|---|---|---|---|
| EP | 2000687 | | 12/2008 | |
| JP | 4619727 B2 | * | 1/2011 | ............... F16D 9/06 |

(Continued)

OTHER PUBLICATIONS

Specification Translation of EP 2000687. Part forming an Oldham hub. Agnus, Bruno. Dec. 10, 2008.*

(Continued)

*Primary Examiner* — Josh Skroupa
(74) *Attorney, Agent, or Firm* — Taft Stettinius & Hollister LLP

(57) ABSTRACT

A drive coupling for connecting a drive shaft to an output member. The drive coupling includes a non-circular body portion defining a central rotational axis, a tang projecting axially from the body portion on the central rotational axis, and at least one through-hole extending through the body portion adjacent the tang. The tang can shear from the body portion in response to the output member seizing during rotation of the drive shaft. The at least one through-hole provides a flow path for fluid to pressurize a lip seal around the drive shaft.

17 Claims, 4 Drawing Sheets

(56) References Cited

U.S. PATENT DOCUMENTS

| | | | |
|---|---|---|---|
| 6,126,407 A | 10/2000 | Guentert et al. | |
| 6,425,749 B1 | 7/2002 | Lettner et al. | |
| 6,814,098 B1 * | 11/2004 | Marocchini | F16B 3/04 |
| | | | 137/315.09 |
| 6,860,373 B2 | 3/2005 | Kundermann et al. | |
| 7,331,873 B2 | 2/2008 | Ibrahim et al. | |
| 7,909,593 B2 | 3/2011 | Ronk et al. | |
| 8,535,019 B2 | 9/2013 | Gummersbach et al. | |
| 8,708,830 B2 * | 4/2014 | Lisiecki | F16D 9/08 |
| | | | 464/32 |
| 9,133,883 B2 * | 9/2015 | Mori | F16D 1/116 |
| 2008/0064506 A1 * | 3/2008 | Lin | F16D 3/68 |
| | | | 464/73 |
| 2010/0279777 A1 | 11/2010 | Lisiecki | |
| 2014/0035444 A1 * | 2/2014 | Jung | H02K 11/215 |
| | | | 310/68 B |
| 2014/0228133 A1 | 8/2014 | Daniel et al. | |

FOREIGN PATENT DOCUMENTS

| | | | | |
|---|---|---|---|---|
| WO | WO-2008149369 A1 * | 12/2008 | | F16D 1/06 |
| WO | WO-2010031541 A1 * | 3/2010 | | F16D 9/06 |

OTHER PUBLICATIONS

Ruland Oldham Couplings, May 2014, also available at www.ruland.com/ps._couplings_oldham.hub.asp.

* cited by examiner

DRIVE COUPLING FOR CONNECTING DRIVE SHAFT TO OUTPUT MEMBER

BACKGROUND

Drive couplings for connecting an end of a drive shaft that is rotated by a drive mechanism with an output member are known. One type of drive coupling includes a solid disc-shaped body made from polyetheretherketone (PEEK) thermoplastic material. The drive coupling includes recesses in opposite side faces of the disc-shaped body, and one recess is engaged to the end of the drive shaft and the other recess is engaged to the output member. Another type of drive coupling includes a disc-shaped body with a central slot for engaging the end of the drive shaft and an outer profile with ears that are received in a correspondingly shaped bore of the output member.

While previous drive couplings are capable of providing a mechanical connection between the drive shaft and the output member, further improvements are needed. For example, a fail-safe mechanism is needed to prevent damage to the draft shaft and the components connected thereto in the event the output member seizes or otherwise fails. In addition, an effective means for providing a seal around the drive shaft should be provided. The present disclosure provides a drive coupling that meets these needs, among others.

SUMMARY

There is disclosed herein systems and apparatus relating to a drive coupling for connecting an output end of a drive shaft of a drive mechanism to an output member of an output mechanism. In one embodiment, the drive mechanism is a pump, and the output mechanism is a gear pump with a gear or pinion forming the output member. Other embodiments contemplate the drive mechanism is a motor, engine, or any other suitable device that is operable to rotate a drive shaft. It is also contemplated that the output mechanism can be a gear drive, a pinion, an input shaft to another component, or any other suitable device that operates by receiving rotational output from a drive shaft.

The drive coupling includes a non-circular body portion defining a central rotational axis, a tang projecting axially from the body portion on the central axis, and at least one through-hole extending through the body portion adjacent the tang. The tang is configured to be received in a receptacle of the drive shaft and shear from the body portion in response to the output member seizing during rotation of the drive shaft. The at least one through-hole provides a flow path for fluid to pressurize a lip seal around the drive shaft. In one embodiment, the drive coupling is made from a thermoplastic material such as polyetheretherketone. In yet another embodiment, the output member of the output mechanism is a gear with a central bore for receiving the tang and the cavity extends around the central bore.

In further embodiments, the drive coupling includes a second through-hole through the body portion on an opposite side of the tang. In further refinements of this embodiment, the tang includes first and second grooves on opposite sides thereof that form extensions of respective ones of the first and second through-holes. In another embodiment, the non-circular body portion includes a central part extending around the tang and opposite first and second ears extending outwardly from central part. In refinements of this embodiment, the tang is elongated along the central part in a direction transverse to the central rotational axis and the first and second ears extend transversely to the tang and transversely to the central rotational axis.

In other embodiments, the body portion of the drive coupling includes a central part extending around the tang and first and second ears extending outwardly from opposite sides of the central part. The tang defines an elongated cross-sectional shape that is elongated in a direction that is transverse to the central rotational axis and transverse to the first and second ears. The body portion further defines first and second through-holes extending through the central part on opposite sides of the tang In still other embodiments, the drive mechanism includes a casing defining an annular passage around the drive shaft. A seal is positioned in the annular passage between the casing and the drive shaft. The output mechanism includes a housing that defines a fluid cavity for housing a fluid, and the drive coupling includes at least one through-hole for passage of the fluid between the fluid cavity and the annular passage to pressurize the seal. In a refinement of this embodiment, the drive coupling includes first and second through-holes on opposite sides of the tang for passage of fluid between the fluid cavity and the annular passage. In a further refinement, the fluid cavity of the output mechanism includes a check valve.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DESCRIPTION THE ILLUSTRATED EMBODIMENTS

Figure 1:
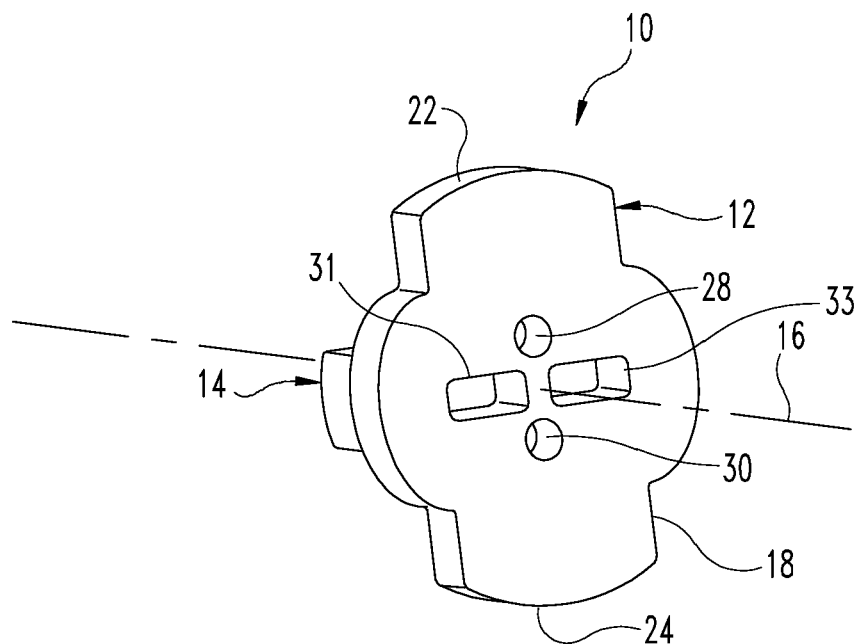
FIG. 1 is a perspective view looking toward a first side of a drive coupling.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Figure 2:
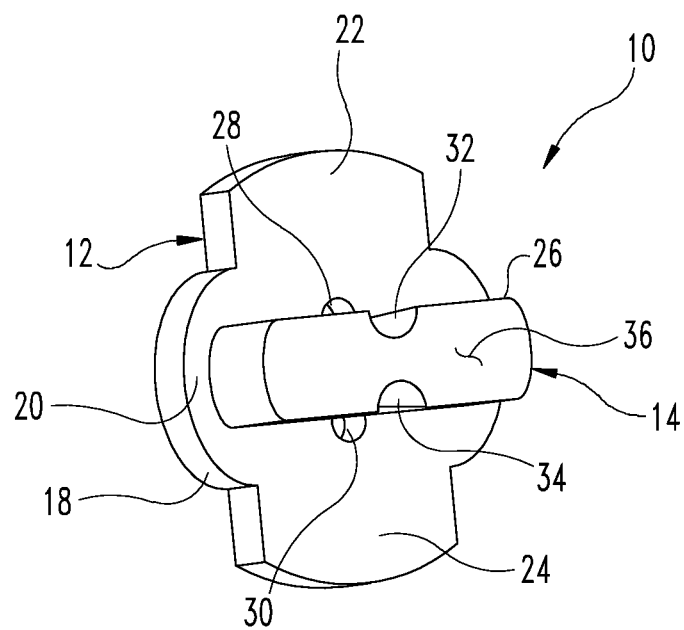
FIG. 2 is a perspective view looking toward a second side of the drive coupling of FIG. 1 that is opposite the first side.

Referring to FIGS. 1-2, there is shown an embodiment of a drive coupling 10. Drive coupling 10 includes a disc-like body portion 12 and a tang 14 projecting axially from body portion 12 on a central rotational axis 16 of body portion 12. Body portion 12 includes a non-circular outer perimeter 18 extending around a central part 20 and opposite first and second ears 22, 24 extending outwardly from central part 20. Ears 22, 24 extend transversely to central rotational axis 16.

Tang 14 includes an elongated cross-section 26 extending transversely to central rotational axis 16 and transversely to first and second ears 22, 24. Central part 20 defines a frame around tang 14 that generally corresponds in shape to tang 14. In the illustrated embodiment, cross-section 26 is rectangular with rounded corners between the adjacent sides, although other cross-sectional shapes are also contemplated. As used herein, transversely includes perpendicular orientations and orientations that vary from perpendicular so long as the transverse orientation is achieved.

Drive coupling 10 further includes a first through-hole 28 and a second through-hole 30 extending axially through central part 20 on opposite sides of tang 14. Through-holes 28, 30 parallel central rotational axis 16. As discussed further below, through-holes 28, 30 provide fluid flow paths through drive coupling 10. Other embodiments contemplate just a single through-hole through body portion 12, and still other embodiments contemplate three or more through-holes through body portion 12.

In the illustrated embodiment, tang 14 includes a first groove 32 extending axially therealong as an extension of first through-hole 28. Tang 14 also includes a second groove 34 extending axially therealong as an extension of second through-hole 30. First and second grooves 32, 34 extend from central part 20 through the outer end 36 of tang 14. First and second grooves 32, 34 allow fluid distribution along tang 14 when received in the receptacle of the drive shaft, as discussed further below. Embodiments without first and second grooves 32, 34 along tang 14 are also contemplated.

Figure 3:
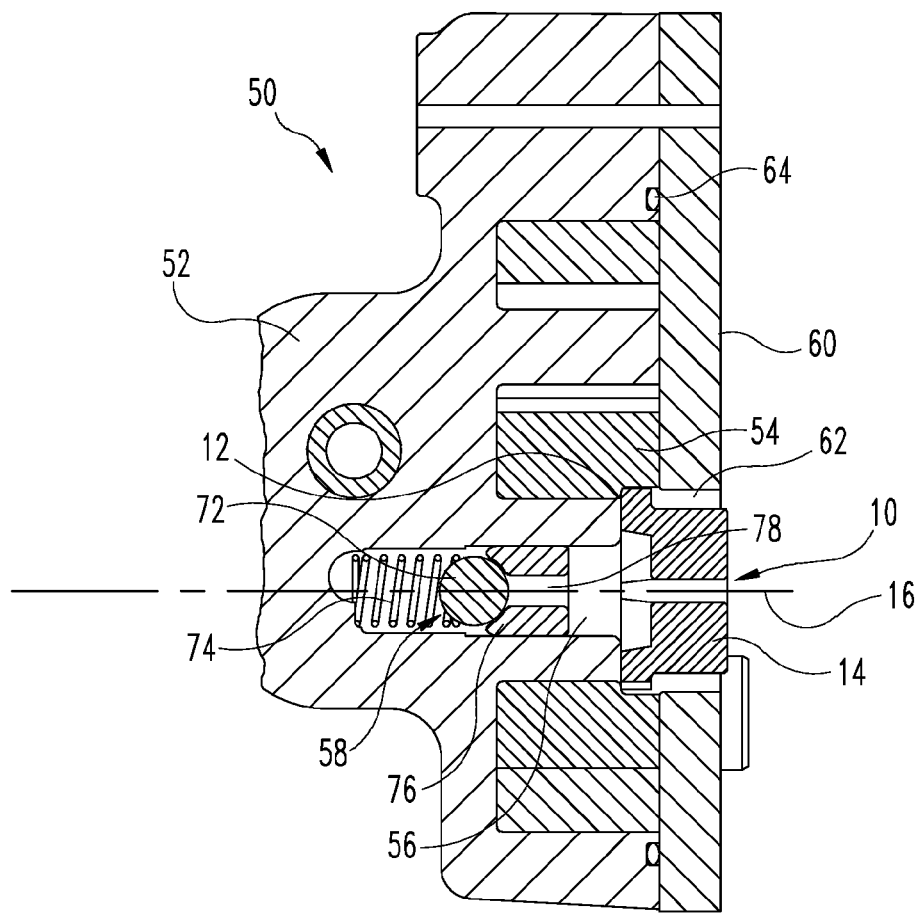
FIG. 3 is a cross-sectional view of an output mechanism with the drive coupling secured to the output mechanism.

Referring to FIG. 3, one embodiment of an output mechanism 50 is shown in cross-section. Output mechanism 50 includes a housing 52 and a rotatable output member 54 within housing 52. Housing 52 further defines a fluid cavity 56, and a check valve 58 is provided in housing 52 to regulate a flow of fluid into and out of fluid cavity 56. In the illustrated embodiment, check valve 58 includes a ball member 72 that is spring biased with a spring 74 against a seat 76. Fluid pressure applied through the opening 78 in the seat 76 can compress spring 74 and allow fluid to flow through drive coupling 10 and out of fluid cavity 56.

Housing 52 further includes a face plate 60 coupled to one side of housing 52 with one or more fasteners extending through face plate 60 and engaged to housing 52. Drive coupling 10 is engaged to output member 54 with tang 14 projecting through a bore 62 of face plate 60. Face plate 60 can compress a housing seal 64 against housing 52.

Figure 4:
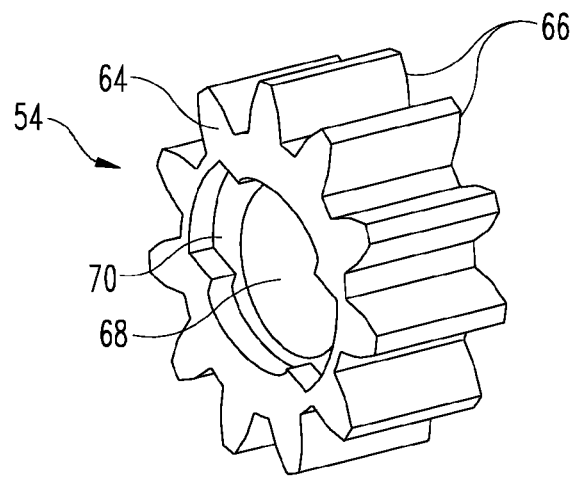
FIG. 4 is a perspective view of one embodiment of an output member of the output mechanism for receiving the drive coupling of FIG. 1.

Referring to FIG. 4, one embodiment of output member 54 in the form of a gear wheel 64 is shown. Gear wheel 64 includes a plurality of gear teeth 66 around its perimeter and a central cylindrical bore 68. Gear wheel 64 further defines a non-circular recess 70 around bore 68 in one face of gear wheel 64. Recess 70 is sized and shaped to correspond in size and shape with the disc-shaped body portion 12 of drive coupling 10. In the illustrated embodiment, recess 70 also includes a central part and opposite ears extending outwardly from the central part like body portion 12. Drive coupling 10 can be positioned in recess 70 and is non-rotatable relative thereto so that rotation of drive coupling 10 rotates output member 54.

Figure 5:
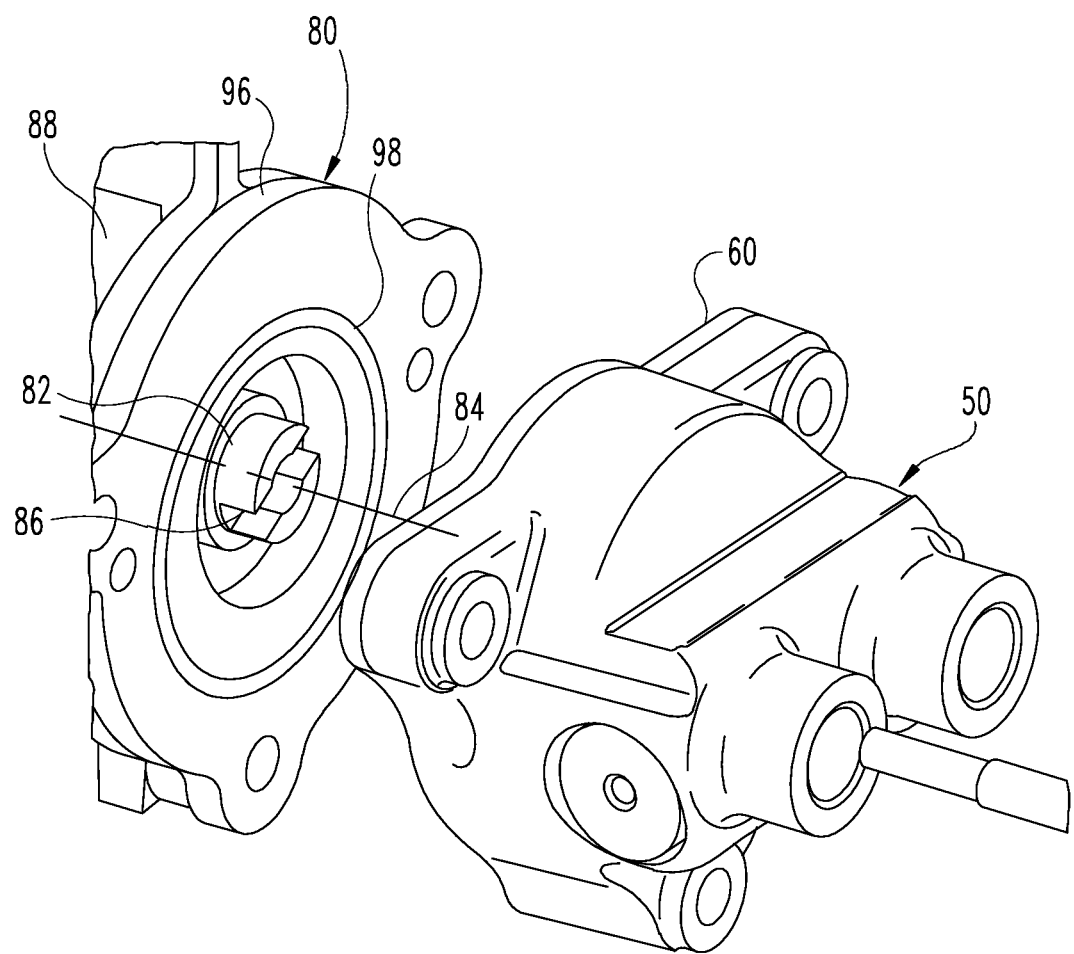
FIG. 5 is an exploded perspective view showing the output mechanism of FIG. 3 and a portion of one embodiment of a drive mechanism for engagement with the output mechanism.
Figure 6:
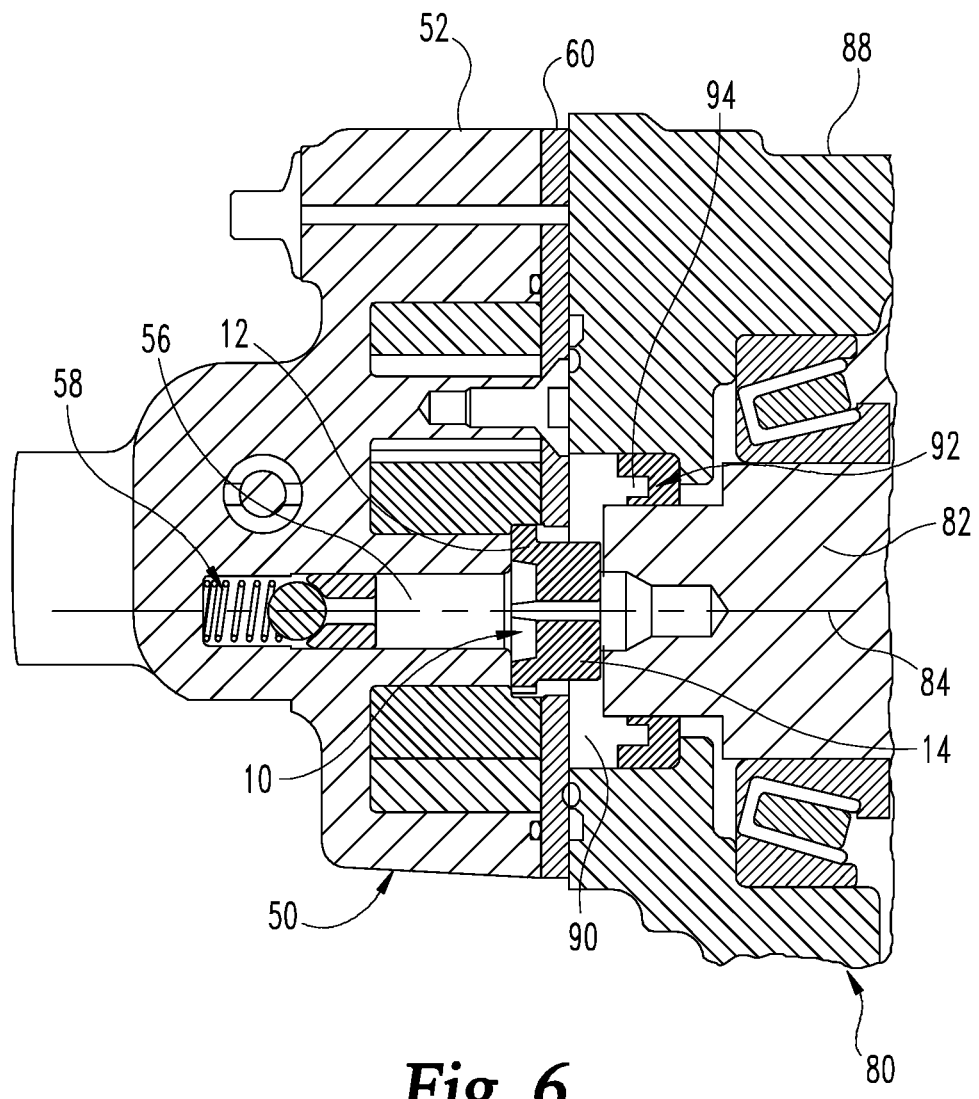
FIG. 6 is a cross-sectional view of the drive mechanism and output mechanism of FIG. 5 with the drive mechanism connected to the output mechanism by the drive coupling of FIGS. 1-2.

Referring to FIG. 5, there is shown an embodiment of a drive mechanism 80 for engagement with output mechanism 50. Drive mechanism 80 includes a drive shaft 82 that rotates about its central axis 84 during operation of drive mechanism 80. Central axis 84 aligns with central rotational axis 16 when drive coupling 10 is engaged thereto. The outer end of drive shaft 82 defines a receptacle 86 that is sized and shaped to receive tang 14 as shown in FIG. 6 so that rotation of drive shaft 82 rotates drive coupling 10, which in turn rotates output member 54. In one embodiment, receptacle 86 is rectangular in cross-section.

Drive mechanism 80 further includes a casing 88 with a faceplate 96. A compression seal 98 provides a sealing interface between faceplate 96 and faceplate 60 when drive mechanism 80 is engaged to output mechanism 50, as shown in FIG. 6.

In certain embodiments, drive coupling 10 is made from a thermoplastic material such as polyetheretherketone. Other suitable thermoplastic materials are also contemplated. In addition, the connection of tang 14 with body portion 12 can be configured so that tang 14 shears from body portion 12 upon application of a driving force with drive shaft 82 while output member 54 is fixed due to seizing or other mechanical issue associated with output mechanism 50. The shearing of tang 14 is designed to prevent damage to drive shaft 82 and other components of drive mechanism 80 connected to drive shaft 82. In FIG. 1 there is shown recesses 31, 33 that remove material connecting tang 14 to body portion 12 that reduce resistance and facilitate shearing at the desired threshold torque.

Drive mechanism 80 also includes a casing 88 that defines a passage 90 around drive shaft 82. An O-ring type seal 92 is positioned in passage 90 to provide a seal between casing 88 and drive shaft 82. To provide balanced pressurization of seal 92, fluid in fluid cavity 56 can flow through through-holes 28, 30 of drive coupling 10 and into passage 90. Seal 92 defines an annular groove 94 facing passage 90 and drive coupling 10 to receive the pressurized fluid from output mechanism 50. The pressurized fluid outwardly forces seal 92 against casing 88 and drive shaft 82. The drive coupling 10 thus allows positive pressure to be maintained on seal 92.

Various aspects of the present application are contemplated. According to one aspect, a system includes a drive mechanism with a drive shaft that is rotated by operation of the drive mechanism. The drive shaft includes an outer end defining a receptacle. The system also includes an output mechanism with a housing and an output member in the housing, where the output member defines a non-circular recess. The system also includes a drive coupling with a non-circular body portion extending around a central rotational axis that aligns with an axis of rotation of the drive shaft. The non-circular body portion is received in the non-circular recess of the output member so that the drive coupling is non-rotatable relative to the output member. The drive coupling further includes a tang projecting from the body portion on the central rotational axis. The tang is non-rotatably received in the receptacle in the outer end of the drive shaft to couple the drive shaft to the output member so that rotation of the drive shaft rotates the drive coupling around the central rotational axis to rotate the output member.

In one embodiment, the drive coupling is made of a thermoplastic material. In a refinement of this embodiment, the tang is configured to shear from the body portion upon application of a threshold force between the tang and the body portion caused by rotation of the drive shaft while the output member is fixed.

In another embodiment, the non-circular body portion includes a central part extending around the tang and opposite first and second ears extending outwardly from central part in a direction that is transverse to the central rotational axis. In a refinement of this embodiment, the tang is elongated along the central part transversely to the central rotational axis and the first and second ears extend transversely to the tang. In a further refinement, the central part defines first and second through-holes on opposite sides of the tang. In yet a further refinement, the tang includes first and second grooves on opposite sides thereof that form extensions of respective ones of the first and second through-holes.

In another embodiment of the system, the drive mechanism includes a casing defining an annular passage around the drive shaft. A seal is positioned in the annular passage between the casing and the drive shaft. The housing of the output mechanism defines a fluid cavity for housing a fluid. The drive coupling includes at least one through-hole for passage of the fluid between the fluid cavity and the annular passage to pressurize the seal. In a refinement of this embodiment, the drive coupling include first and second through-holes on opposite sides of the tang for passage of fluid between the fluid cavity and the annular passage. In a further refinement, the fluid cavity includes a check valve.

In another embodiment, the output member is a gear with a central bore for receiving the tang and the non-circular recess extends around the central bore. In yet another embodiment, the drive mechanism is a pump and the output mechanism is a gear drive.

In another aspect, an apparatus includes a thermoplastic drive coupling with a non-circular body portion defining a central rotational axis. A tang projects axially from the body portion on the central rotational axis, and at least through-hole extends through the body portion adjacent the tang.

In one embodiment, the drive coupling includes a second through-hole on an opposite side of the tang. In a refinement of this embodiment, the tang includes first and second grooves on opposite sides thereof that form extensions of respective ones of the first and second through-holes.

In another embodiment, the non-circular body portion includes a central part extending around the tang and opposite first and second ears extending outwardly from central part. In a refinement of this embodiment, the tang is elongated along the central part in a direction transverse to the central rotational axis and the first and second ears extend transversely to the tang and transversely to the central rotational axis.

In another embodiment, the thermoplastic material is polyetheretherketone.

In another aspect, an apparatus includes a drive coupling. The drive coupling includes a body portion defining a central rotational axis and a tang projecting axially from the body portion on the central rotational axis. The body portion includes a central part extending around the tang and first and second ears extending outwardly from opposite sides of the central part in a direction transverse to the central rotational axis. The tang defines an elongated cross-sectional shape transverse to the central rotational axis and transverse to the first and second ear. The body portion further defines first and second through-holes extending through the central part on opposite sides of the tang.

In one embodiment, the drive coupling is comprised of a thermoplastic material.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system, comprising:
    a drive mechanism including a drive shaft that is rotated by operation of the drive mechanism, the drive shaft including an outer end defining a receptacle, the drive mechanism includes a casing defining an annular passage around the drive shaft, and further comprising a seal in the annular passage between the casing and the drive shaft;
    an output mechanism including a housing and an output member in the housing, wherein the output member defines a non-circular recess, the housing of the output mechanism defines a fluid cavity for housing a fluid; and
    a drive coupling including a non-circular body portion extending around a central rotational axis that aligns with an axis of rotation of the drive shaft, the non-circular body portion being received in the non-circular recess of the output member so that the drive coupling is non-rotatable relative to the output member, the drive coupling further including a tang projecting from the body portion on the central rotational axis, wherein the tang is non-rotatably received in the receptacle in the outer end of the drive shaft to couple the drive shaft to the output member so that rotation of the drive shaft by the drive mechanism rotates the drive coupling around the central rotational axis to rotate the output member, the drive coupling includes at least one through-hole for passage of the fluid between the fluid cavity and the annular passage to pressurize the seal.

2. The system of claim 1, wherein the drive coupling is made of a thermoplastic material.

3. The system of claim 2, wherein the tang is configured to shear from the body portion upon application of a threshold force between the tang and the body portion caused by rotation of the drive shaft while the output member is fixed.

4. The system of claim 1, wherein the non-circular body portion includes a central part extending around the tang and opposite first and second ears extending outwardly from the central part in a direction that is transverse to the central rotational axis.

5. The system of claim 4, wherein the tang is elongated along the central part transversely to the central rotational axis and the first and second ears extend transversely to the tang.

6. The system of claim 5, wherein the at least one-through includes first and second through-holes on opposite sides of the tang.

7. The system of claim 6, wherein the tang includes first and second grooves on opposite sides thereof that form extensions of respective ones of the first and second through-holes.

8. The system of claim 1, wherein the at least one through-hole includes first and second through-holes on opposite sides of the tang for passage of fluid between the fluid cavity and the annular passage.

9. The system of claim 8, wherein the fluid cavity includes a check valve.

10. The system of claim 1, wherein the output member is a gear with a central bore for receiving the tang and the non-circular recess extends around the central bore.

11. The system of claim 1, wherein the drive mechanism is a pump and the output mechanism is a gear drive.

12. An apparatus, comprising:
a thermoplastic drive coupling including a non-circular body portion defining a central rotational axis, a tang projecting axially from the body portion on the central rotational axis, and a first and a second through-hole extending through the body portion on opposite sides of the tang, wherein the tang includes first and second grooves on opposite sides thereof that form extensions of respective ones of the first and second through-holes.

13. The apparatus of claim 12, wherein the non-circular body portion includes a central part extending around the tang and opposite first and second ears extending outwardly from central part.

14. The apparatus of claim 13, wherein the tang is elongated along the central part in a direction transverse to the central rotational axis and the first and second ears extend transversely to the tang and transversely to the central rotational axis.

15. The apparatus of claim 12, wherein the thermoplastic material is polyetheretherketone.

16. An apparatus, comprising:
a drive coupling including a body portion defining a central rotational axis and a tang projecting axially from the body portion on the central rotational axis, wherein the body portion includes a central part extending around the tang and first and second ears extending outwardly from opposite sides of the central part in a direction transverse to the central rotational axis, wherein the tang defines an elongated cross-sectional shape transverse to the central rotational axis and transverse to the first and second ears, the body portion further defining first and second through-holes extending through the central part on opposite sides of the tang.

17. The apparatus of claim 16, wherein the drive coupling is comprised of a thermoplastic material.

* * * * *